Dec. 25, 1928.
W. D. KYLE
1,696,491
INSULATOR RACK
Filed Sept. 24, 1923
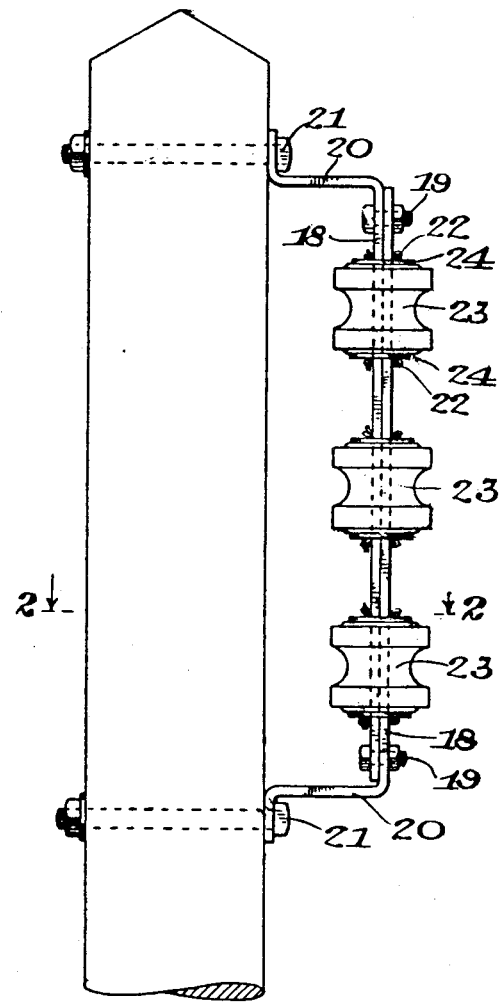
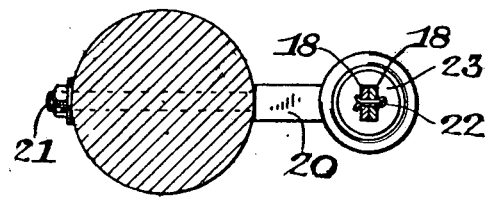
WITNESSES
INVENTOR
William D. Kyle.
By R S Caldwell
ATTORNEY Patented Dec. 25, 1928.

1,696,491

UNITED STATES PATENT OFFICE.

WILLIAM D. KYLE, OF MILWAUKEE, WISCONSIN, ASSIGNOR TO LINE MATERIAL COMPANY, OF SOUTH MILWAUKEE, WISCONSIN, A CORPORATION OF WISCONSIN.

INSULATOR RACK.

Application filed September 24, 1923. Serial No. 664,475.

The invention relates to secondary racks.

One of the objects of the invention is to provide a secondary rack in which the usual base and separate insulator-supporting rods are dispensed with, thereby reducing the number of parts and the cost of manufacture of the rack.

A further object of the invention is to provide a rack having the above mentioned features with provision for removing or replacement of insulators.

The invention further consists in the several features hereinafter set forth and more particularly defined by claims at the conclusion hereof.

In the drawings: Fig. 1 is an elevation of a rack embodying the invention; and Fig. 2 is a detail sectional view taken on the line 2—2 of Fig. 1.

Referring to the drawing, an insulator-supporting member is made up of two complementary L-shaped members 18 joined together by bolts 19 to form a U-shaped rack having its leg portions 20 clamped to a pole or other support by bolts 21. The laterally adjacent portions of the members 18 are provided with alined holes at spaced intervals to take cotter pins 22 between which insulators 23 are held, washers 24 being preferably provided between the ends of the insulators and the pins. This form of bracket may be extensible in its transverse portion by shifting the adjacent portions relative to each other and bolting them together in different positions of adjustment. The replacement of insulators may be effected by disconnecting the members 18 forming the rack and disconnecting one of said members from the pole. The insulators 23 are in the nature of apertured insulators through which the members 18 are received and may be of any suitable construction.

I desire it to be understood that this invention is not to be limited to any specific form or arrangement of parts except in so far as such limitations are included in the claims.

What I claim as my invention is:

1. A secondary rack comprising a pair of complementary elements secured together to form a U-shaped insulator supporting member having spool insulators threaded on its transverse portion, insulator-retaining members passing through said pair of complementary elements, and fastening means securing the leg portions of said member to a support.

2. A secondary rack comprising a pair of relatively extensible complementary elements secured together in overlapping relation to form a U-shaped insulator-supporting member having spool insulators threaded on its transverse portion and insulator-retaining members passing through said overlapping complementary elements.

3. A secondary rack comprising a pair of bars secured together side by side in lateral abutment and having spool insulators threaded thereon, and insulator retaining and spacing members passing through said lateral abutting bars, each of said bars including a terminal laterally-extending leg portion adapted to be secured in abutment with a support and spacing the insulator-carrying portions of said bars from said support.

In testimony whereof, I affix my signature.

WILLIAM D. KYLE.